United States Patent [19]
Anderson

[11] 4,189,262
[45] Feb. 19, 1980

[54] APPARATUS AND METHOD FOR HANDLING DRY BULK MATERIALS IN A HOPPER-TYPE CONTAINER USING AIR AGITATION

[75] Inventor: Arthur I. Anderson, St. Paul, Minn.

[73] Assignee: Butler Manufacturing Company, Kansas City, Mo.

[21] Appl. No.: 904,789

[22] Filed: May 11, 1978

[51] Int. Cl.² ............................................. B65G 53/38
[52] U.S. Cl. .................................... 406/136; 366/107
[58] Field of Search .................... 302/14, 15, 16, 20, 302/53, 66; 366/101, 107; 222/195; 406/136, 137, 119

[56] References Cited

U.S. PATENT DOCUMENTS

| | | | |
|---|---|---|---|
| 2,143,273 | 1/1939 | Ladd | 302/14 X |
| 3,512,842 | 5/1970 | Milewski et al. | 302/14 X |
| 3,929,261 | 12/1975 | Solimar | 302/53 X |

*Primary Examiner*—Jeffrey V. Nase
*Attorney, Agent, or Firm*—Shoemaker and Mattare, Ltd.

[57] ABSTRACT

An apparatus and method for forming and handling a slurry in a hopper-type container, preferably a hopper railroad car. The product may be unloaded dry using air or the product may be aerated, then liquefied while air continues to be forced thereinto, then agitated and mixed to insure formation of a slurry or solution having consistent properties. The slurry or solution is aerated during the discharge thereof from the container. The aeration for dry or liquid discharge is preferably performed using aeration devices such as that device disclosed in U.S. Pat. No. 3,929,261.

15 Claims, 11 Drawing Figures

APPARATUS AND METHOD FOR HANDLING DRY BULK MATERIALS IN A HOPPER-TYPE CONTAINER USING AIR AGITATION

BACKGROUND OF THE INVENTION

The present invention relates in general to hopper-type containers, and more particularly, to forming and handling a slurry and solutions in hopper-type railroad cars.

For certain materials, storage and discharge thereof in slurry form has many advantages over storage and discharge thereof in dry form. For the sake of convenience, a generic term "liquefied mass" will be used to include both a slurry and a solution. However, no limitation on the scope of the invention is intended by this terminology, and such is being employed only for the convenience thereof. In some instances, transportation in slurry form may also be advantageous over transportation in dry form. Thus, it is quite common for many materials to be stored and discharged in slurry form.

Generally, a slurry is formed in a container by initially loading material in dry form into a container, then liquefying that dry material by pumping a liquid into the container and mixing that liquid with the material while sometimes adding air in the late stages of agitation.

If the liquid is not thoroughly mixed with the initially dry material, the slurry has non-uniform properties, such as density, consistency, and the like. Such a non-uniform slurry causes many problems in handling and discharge of that slurry material. While high pressure liquid introduction into the container may help somewhat in the mixing steps, this method is not entirely satisfactory.

The inventor is aware of slurry unloading systems, such as that disclosed in U.S. Pat. Nos. 3,512,842 and 3,378,387. In U.S. Pat. No. 3,512,842, air is discharged into the bulk material. However, in systems such as that disclosed in the just-mentioned patent, the air discharge apparatus is simply a plurality of pipes extending upwardly into a hopper. There is no device capable of discharging gas at or very near the bottom of the hopper, and in a manner which efficiently mixes and fluidizes the material. Merely discharging air into the body of such material is not sufficient to adequately fluidize that material, or to fluidize the material near that location on the hopper used as an inlet for liquid and/or an exit for the slurry or solution. Furthermore, there is no provision in U.S. Pat. No. 3,512,842 for coupling the liquid and air lines to promote efficient fluid handling to and from the hopper.

The device disclosed in U.S. Pat. No. 3,512,842 thus is susceptible to compacting of the dry product, which may result in product lumps into which liquid will not penetrate. Such lumps are detrimental to a slurry or solution handling method.

Thus, the inventor is not aware of any means or method for transforming into slurry form an initially dry product which is to be stored and handled in slurry form in a hopper-type container, and particularly in a hopper-type railroad car, which is thorough enough to completely assure the formation of a slurry which is consistent and thoroughly liquefied. The present invention is embodied in a means and method for insuring the formation of a consistent and thoroughly liquefied slurry or solution.

SUMMARY OF THE INVENTION

The present invention is embodied in a means and method for thoroughly liquefying, mixing and agitating a product which is to be stored and/or discharged and/or transported in slurry or solution form from a hopper-type container, and particularly, a hopper-type railroad car.

In accordance with the teaching of the present invention, a hopper-type container having a plurality of hoppers includes a system of pipes and valves for conducting gas and liquid, such as air and water, respectively, to the individual hoppers. Each hopper includes a plurality of aeration devices on the bottom thereof for conducting air into the hopper, and hence into the material contained in that hopper. A preferred aeration device is disclosed in U.S. Pat. No. 3,929,261, issued to Keith F. Solimar on Dec. 30, 1975 (hereinafter referred to as the Solimar patent). The disclosure of the aeration device in the Solimar patent is full and complete, and is therefore fully incorporated herein by reference thereto. Details of the preferred aeration device will not be herein presented, and attention is directed to the referenced Solimar patent for a full description and discussion of those details. Also, for the sake of convenience, the invention will be disclosed as applied to a railroad car. However, other hopper-type containers can be used without departing from the scope of the present invention. The single system embodying the present invention which can be used both for unloading a product dry and in homogenous slurry form adds considerable flexibility to a hopper-type rail car.

In the method of forming and discharging a slurry embodying the present invention, the dry material in the railroad car is first thoroughly aerated using a device which discharges air at or near the hopper bottom, preferably using the Solimar aeration devices, thus promoting efficient fluidization of the material before and during the slurry or solution formation stage and during the step of withdrawing the slurry or solution from the container. The aerated material is then liquefied while aeration is continued, thereby insuring a thoroughly liquefied mass. Large quantities of air are forced into the liquefied product through the liquid handling systems, thereby thoroughly agitating and mixing the liquefied product. During product discharge, air is again forced into the slurry via the aeration devices, which again, insures a thoroughly mixed and agitated slurry which is handled as a liquid.

According to the teachings of the present invention, the thorough aeration of the dry product, the liquefied product and the slurry insures a slurry which is consistent. The consistency of a slurry handled according to the teachings of the present invention is much greater than the consistency of the slurries handled according to the teachings of that prior art known to the inventor.

The liquid used to form a slurry can be supplied from an external source in any suitable manner, and the liquid handling system may include other elements, such as, for example, a standpipe arrangement wherein liquid from a container is withdrawn and handled during formation of the slurry, or elements for circulating liquid through an external pump and back into the car. In the interest of clarity, the exact nature of the liquid circulation system used in conjunction with the liquid of the car will not be discussed. It is to be emphasized, however, that a suitable liquid supply system is included within the teachings of the present invention.

A plural hopper railroad car can also include means for recirculating slurry from one hopper to another without the use of a standpipe or other similar device. In such an embodiment, the discharge apparatus on the hoppers of the car include valves and hoses which can be configured for fluidly connecting the hoppers to a main discharge manifold in a manner such that the aforementioned hopper-to-hopper slurry recirculation can be carried out when desired.

OBJECTS OF THE INVENTION

It is, therefore, a main object of the present invention to produce a slurry or solution which has consistent properties.

It is another object of the present invention to, in the formation of a slurry, thoroughly aerate a dry product prior to liquefication thereof.

It is yet another object of the present invention to, in the formation of a slurry, thoroughly aerate a liquefied product during an agitating and mixing step.

It is still another object of the present invention to, in the handling of a slurry, thoroughly aerate an agitated and mixed product during the discharge thereof from a container.

It is a further object of the present invention to discharge a dry bulk product from a container using an aeration pressurizing system.

It is a specific object of the present invention to, in the formation and handling of a slurry in a hopper-type railroad car, aerate that product using the aeration device disclosed in U.S. Pat. No. 3,929,261.

These together with other objects and advantages which will become subsequently apparent reside in the details of construction and operation as more fully hereinafter described and claimed, reference being had to the accompanying drawings forming part hereof, wherein like reference numerals indicate like parts throughout.

DETAILED DESCRIPTION OF THE INVENTION

Shown in FIGS. 3-6 is a hopper-type railroad car 10 having the usual wheel assembles 12 supporting a chassis 14. The car 10 includes a plurality of hoppers 20 each of which is formed by downwardly converging hopper walls 24 to form generally conical hoppers for storing product P therein. The drawings show three hoppers, however, more or fewer hoppers can be used without departing from the spirit and scope of the present invention. It is also noted that car 10 is shown only schematically as the general and overall makeup of that car does not form part of the present invention. Thus, partitions, and the like, are not shown in figures, but it is to be understood that such general equipment is considered to be part of the car 10. The car 10 also includes a plurality of normally-closed hatches, or manholes 26, each having the usual manhole covers 30 thereon. A relief valve 40 is noted on the top 42 of the car body 44.

Figure 1:
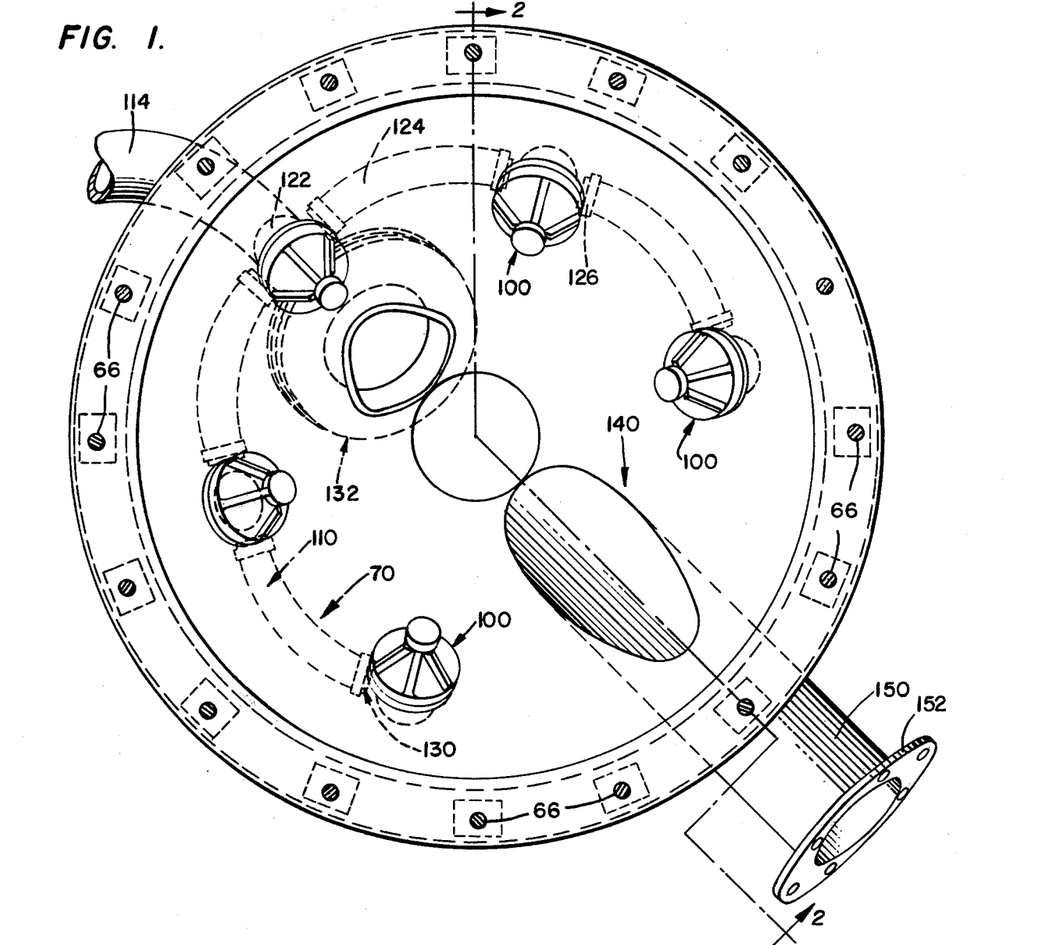
FIG. 1 is a plan view of the bottom of a hopper used in a hopper-type railroad car incorporating the teachings of the present invention.
Figure 2:
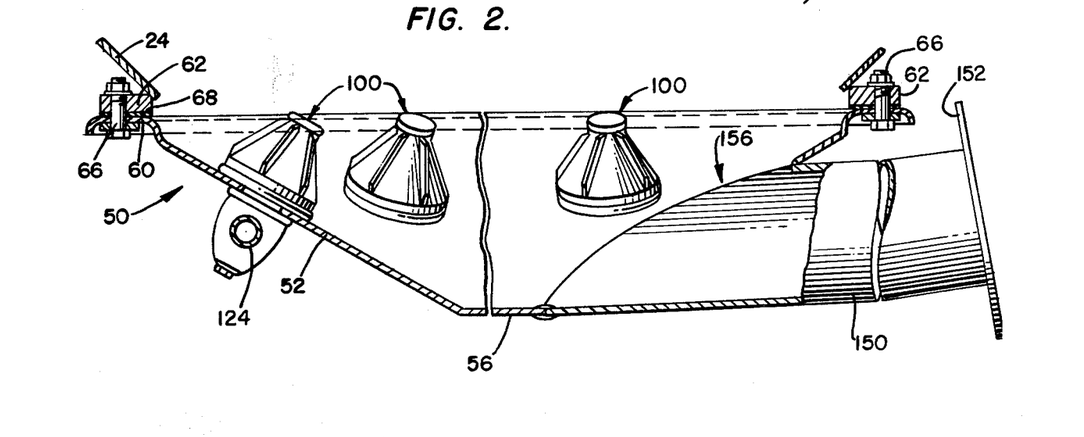
FIG. 2 is a view taken along line 2—2 of FIG. 1.

Referring to FIGS. 1 and 2, it is seen that the hoppers each have a lower section 50 which includes a sloped wall 52 and a horizontal bottom 56. The wall 52 has an annular flange 60 which is attached to the hopper wall 24 by a coupling brace 62 and fastening means, such as bolts 66. An annular gasket 68 is interposed between the brace 62 and the flange 60 to insure tight sealing of the lower section 50 to the hopper wall 24.

As above-discussed, to facilitate proper storage and discharge of product P, gas and liquid flow systems are provided. The gas is preferably air, and the liquid is preferably water, but other fluids can be used without departing from the scope of the present invention. An air system 70 includes a plurality of aeration devices 100 mounted on the lower section wall 52 at a plurality of spaced locations. The aeration device 100 is fully disclosed in the referenced Solimar patent, and attention is directed thereto for a complete discussion thereof. It is here noted that the devices 100 discharge air at or near the bottom of the hopper so that air efficiently fluidizes, and maintains fluidized, the product. In this manner, even that product located immediately adjacent the hopper bottom will be adequately fluidized. Thus, no clumps, or dry volumes will be present in the product.

An air manifold system 110 includes an air inlet hose 114 connected to one of the aeration devices for conducting air from a suitable source (not shown) to the aeration devices. The aeration devices each includes a double-port inlet chamber 122 and are fluidly interconnected by a plurality of hoses 124 coupled to the inlet chambers of the devices 100 by hose clamps 126, or the like. The inlet chambers have coupling means 130 thereon for receiving the hoses. As discussed in the aforementioned patent, air supply to each of the aeration devices is discharged outwardly thereof into the hopper in a prescribed manner.

As shown in FIG. 1, the hopper can include a cleanout 132 if suitable, however, such an element is not an essential part of the system herein disclosed and is shown in FIG. 1 only for the sake of convenience.

A liquid flow system 140 includes a conduit 150 connected at one end thereof to the lower section 50 as shown in FIGS. 1 and 2 and has a connecting flange 152 on the other end thereof. As shown in FIG. 2, a portion of the lower section bottom forms part of an end 156 of the conduit 150. According to the flow direction, end 156 is either an inlet end or a discharge end. Such positioning increases the efficiency of liquid flow into and out of the conduit 150. The usual pipe and hose hangers and other supporting equipment are also included in the fluid systems herein disclosed, but are not shown for the sake of convenience.

Figure 3:
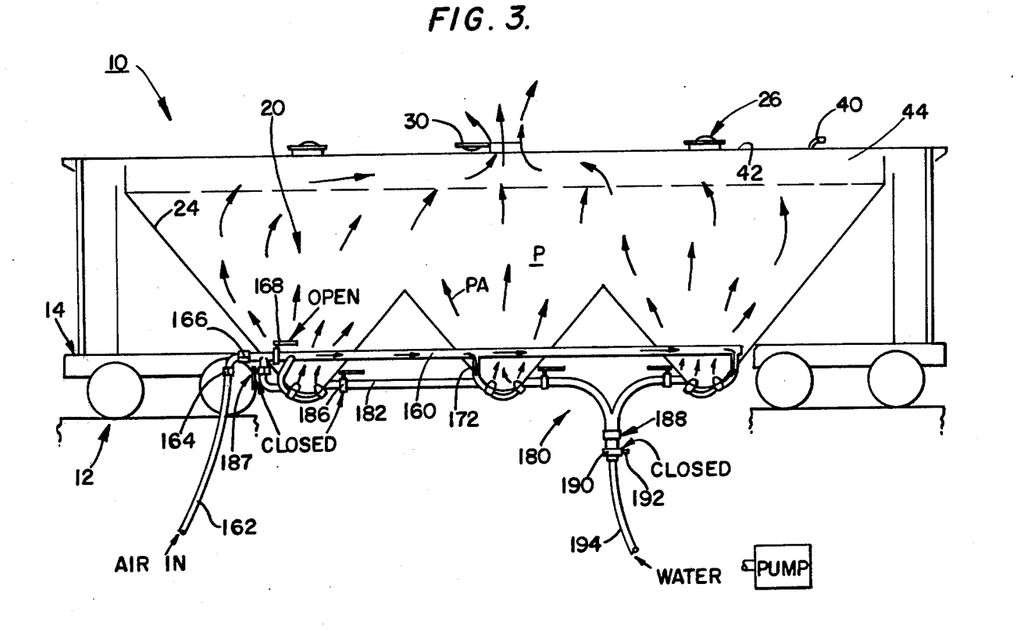
FIGS. 3, 4, 5 and 6 illustrate the configurations of the elements associated with a hopper-type railroad car during the various steps involving the formation and handling of a slurry or a solution in accordance with the teachings of the present invention.

As best shown in FIG. 3, the air flow system 110 includes a main air inlet line 160 fluidly connected to a main air inlet hose 162 by suitable couplings, such as coupling 164 and a check valve 166. The air line 160 is preferably a 3 inch line. The control valve is used to regulate air flow through the system. A further flow regulating valve 168 is mounted on the air inlet line 160. The individual hopper air flow systems are fluidly connected to the main air inlet line 160 by couplings, such as coupling 172 which can be a tee, or the like. A lock nut, or like fastener, couples air inlet hose 114 of each hopper air flow system to the coupling 172, and thus, regulated air flow from a source through control valve 168 and to the individual hopper systems is permitted via air inlet line 160 and the couplings 172.

A main liquid system 180 includes a main liquid line 182 fluidly connected to each hopper conduit 150 and having a plurality of control valves 186 thereon. Each valve 186 is located adjacent a hopper for controlling liquid flow to and from that hopper individually and independently of the flow to other hoppers, as will be discussed below. The main liquid line 182 is also connected to the air inlet line 160, and a main control valve 187 is located to fluidly isolate and connect the air inlet line 160 and the liquid line 182.

The liquid system includes a main liquid interface coupling 188 having a valve 190 connecting the main liquid line, or, as shown in FIG. 3, branches of the main liquid line, to a suitable liquid system. If suitable, the outlet valve can be manually controlled via handle 192. A pump is schematically illustrated in FIG. 3 to indicate a motive means for the liquid system. In addition, the car has a 15 psig pressure capability and can be pressurized to assist in the discharge of the slurry or solution.

As shown in FIG. 3, the discharge line 182 forms a wye adjacent the coupling 188, whereby the liquid line from one of the hoppers is fluidly connected to the liquid lines of the other hoppers. The wye-connection can be placed anywhere on the containers, but is most conveniently located adjacent an endmost hopper.

Figure 4:
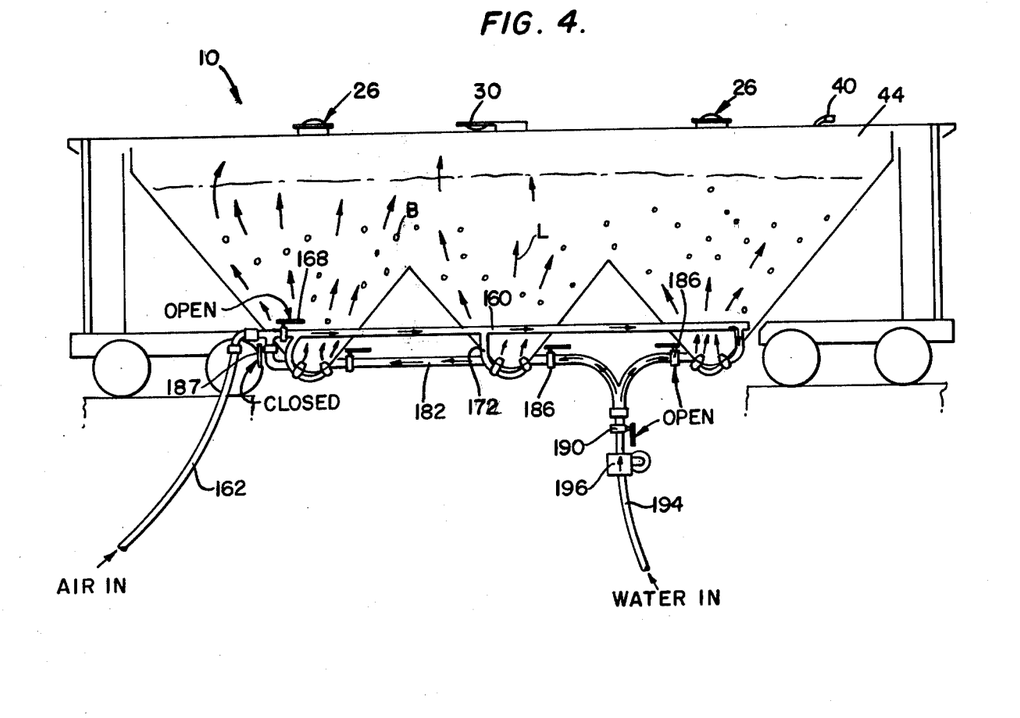

As shown in FIGS. 3 and 4, a main water inlet line 194 is fluidly and releasably attached at one end thereof to valve 190 and at the other end thereof to a source of liquid (not shown), and in this case, water. A water meter 196 can be attached to the line 194 if suitable.

Figure 5:
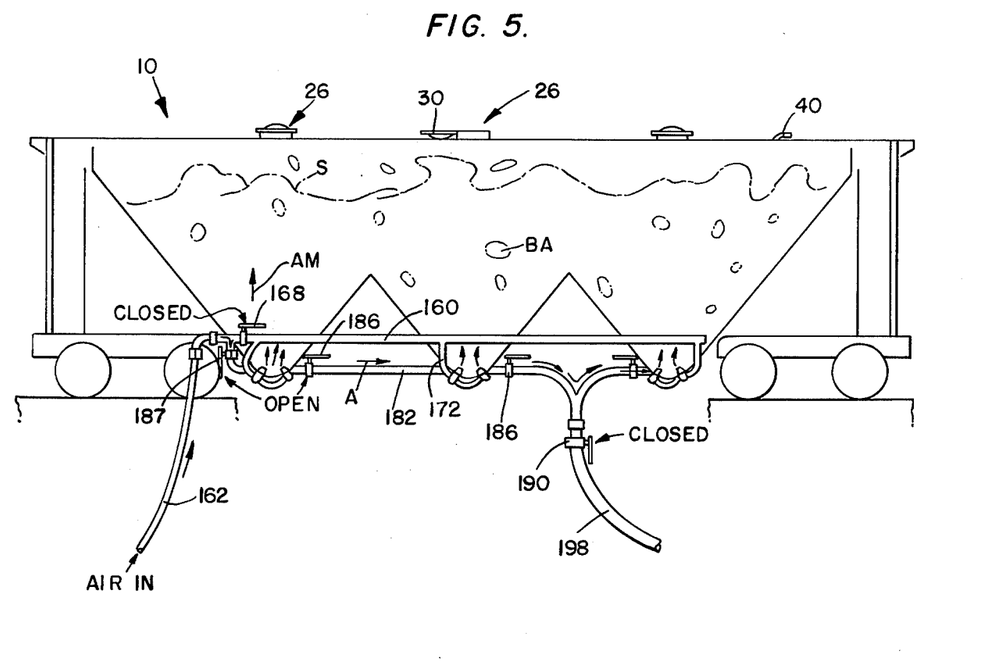
Figure 6:
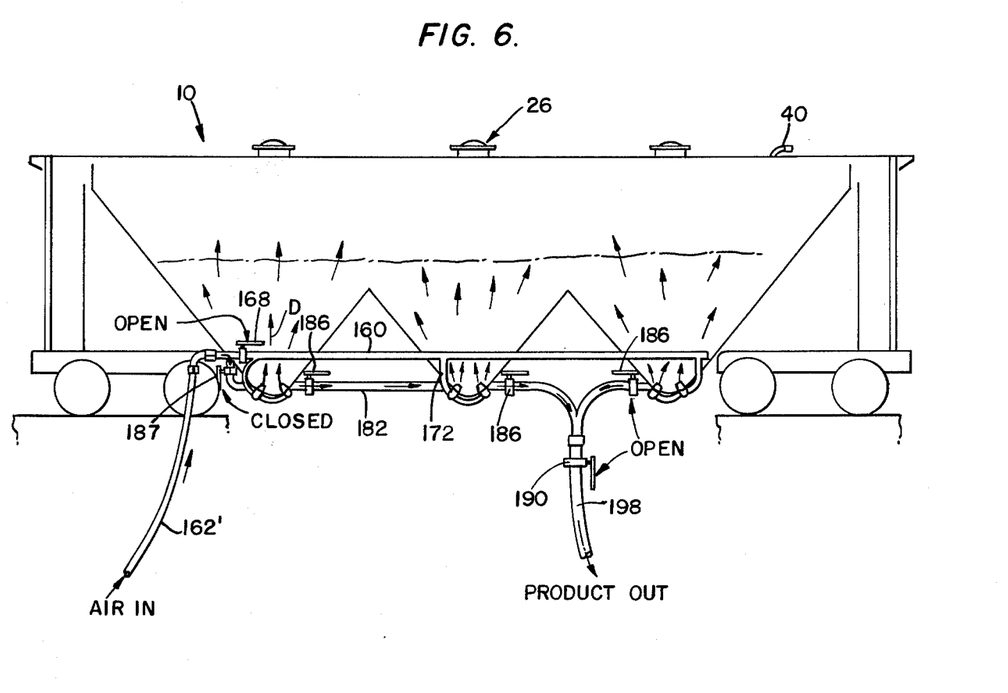

As shown in FIGS. 5 and 6, a product line 198 is fluidly and releasably attached at one end thereof to the valve 190 and at the other end thereof to a suitable product receptacle (not shown).

Referring to FIGS. 3–6 inclusively, the method of handling material in relation to the car 10 will be described in detail.

Product aeration is conducted with the car elements in the configuration shown in FIG. 3. In the FIG. 3 configuration, one of the manholes 26 is open to permit air to escape from the car, the valves 186 and 187 are closed to prevent escape of product P from the hopper, valve 190 is closed to isolate the hopper from a source of water, and the control valve 187 is closed to fluidly isolate the liquid line 182 from the air inlet line 162.

In this configuration, air is pumped from the source, through the hose 162, into line 160 and then into the hopper air flow systems 70 via inlet hoses 114. The air then passes through the aeration devices 100 upwardly into the product as indicated by arrows PA in FIG. 3. The air discharged by devices 100 passes upwardly through the product, and then out of the open manhole. Product aeration is conducted as described in the aforementioned patent, and is continued until the product is suitably aerated.

The aeration devices serve to distribute air into the product in a proper manner which aerates the product in a manner which is much more efficient and effective than in prior art systems as discussed in the referenced patent.

After the product is sufficiently aerated, a product liquefication step is performed to convert a dry product into a slurry for convenient storage, discharge, or shipment. Product liquefication is conducted with the car elements in the configuration shown in FIG. 4. In the FIG. 4 configuration, the one manhole is still open, and a water hose is attached to valve 190. It is noted that the water hose is shown in FIG. 3 to have been attached in the product aeration step as well, but in that step, the valve 190 was closed. The valves 186 are open and water is permitted to flow into and through the water line 182 to the hoppers via conduits 150. The control valve 187 remains closed, and the valves 168 remain open to thus continue the induction of air into the hoppers via the air flow systems 70. Thus, bubbles B are formed and air continues to flow through the product in the direction indicated by arrows L in FIG. 4. After flowing through the product, the air flows out of the car via the open manhole. In this manner, the product is liquefied via the liquid system and aerated via the aeration devices 100 simultaneously.

The liquefication step is continued until the product is sufficiently liquefied.

The aeration devices serve to infuse air into the product in a manner which promotes liquefication by keeping the product thoroughly mixed and agitated as the liquid is being forced into the car. Absent such product fluidization, the product may coagulate or coalesce into clumps, thus vitiating the liquefication step. The aeration devices thereby promote liquefication so that liquefication in the presently disclosed process occurs much more efficiently and thoroughly than in those processes known prior to the present disclosure.

After completion of the liquefication step, a product agitation and mixing step is conducted to produce a proper product density and configuration. Product agitation and mixing is conducted with the car elements in the configuration shown in FIG. 5. In the FIG. 5 configuration, the water hose is changed to a product hose, and the valve 190 is closed to isolate the product hose from the rest of the system and to thus prevent loss of product during this step. The valves 186 are open as is the valve 187. The valve 168 is closed to isolate the air flow systems, and air is forced from the source though air inlet hose 162 and thus through the liquid line 182 and into the hoppers via conduits 150. In this sequence, valves 168 and 187 are used as cross-over valves for forcing air in suitable quantities through the hopper liquid inlet systems from an air supply system. It is here noted that this liquid system is also the product discharge system as is discussed herein. Air flow is indicated in FIG. 5 by arrows A, and flows into the hoppers and forms large bubbles BA due to the large quantities of air infused into the liquefied product via conduit passage 156. The air influx quantities in the agitating and mixing step are greater than the other previous steps due to the difference in air flow capacity of the liquid system vis-a-vis the air flow system. The valves 187 and 168 are used to adjust the amount of air flowing into the appropriate system. Thus, during the various steps, valve 168 is opened so that the air flows through aeration devices 100 in the FIGS. 3 and 4 steps with the valve 187 closed, and valve 168 is closed and valve 187 is opened to direct all of the air into hoppers through open valves 186 in the FIG. 5 step. The quantity of air is also indicated by the size of the bubbles in FIG. 5 as compared to the bubble sizes shown in FIG. 4. It is noted that, for some products, the aeration using the devices 100 prior to this step may sufficiently aerate the product so that continued aeration is not necessary.

The large bubbles in FIG. 5 produce an agitation and mixing action of the liquefied product, as indicated by the broken product surface line S in FIG. 5. Air flows from the car via the open manhole, and moves upwardly through the car in the direction indicated by arrows AM in FIG. 5.

It is noted that, while a hose is shown in FIG. 5 as being connected to valve 190, such connection is not necessary as the valve 190 is closed. Thus, if the product is to be stored, or moved after the agitating and mixing step, the valve 190 may just be closed off and free of any connection downstream thereof.

It is also noted that either the aeration and/or the agitating and mixing steps can be conducted during storage of the liquefied product to protect against settling or other similar phenomena which might occur during long periods of quiescence of the liquefied product. Periodic aeration and/or agitating and mixing will keep that slurry "stirred up" sufficiently to prevent such settling.

After the agitating and mixing step, the product can be suitably stored, transported, or the like with the manholes 26 closed. The product is discharged in a discharge step with the car in the configuration shown in FIG. 6. The manhole 26 is closed so that air introduced into the car pressurizes the car. The car has a pressure capacity of 15 psig, and can therefore be pressurized to assist in the discharge step. This pressure serves to assist in the product unloading, and in a preferred embodiment is 15 psig (maximum). In the FIG. 6 configuration, air is conducted to the car from a suitable source (not shown) via an air inlet hose 162', and valve 168 is open so that air is conducted to the air flow systems 70 of the hoppers. It is noted that the prime notation is used to indicate a movement of the car from a loading area to a discharge area, but such areas may be the same if desired. The valve 187 is closed so that all of the air supplied via hose 162' is forced through the aeration devices into the product to maintain the product thoroughly agitated without interfering with product discharge in any way. The valves 186 are open as is valve 190, thereby fluidly connecting the hoppers to a discharge line 198 via conduits 150 and line 182.

Air flows into the product in the direction of arrows D in FIG. 6. It is also noted that use of air pressure to unload is optional, and a pump (not shown) may be used with or without air pressure.

While specific elements of a liquid circulation means, such as pumps, and the like, have not been illustrated in the Figures as being associated with the car, it is to be understood that such circulation means can be used. For example, the discharge side of a pump can be connected either to discharge hose 198 in FIG. 6, or to water line 194 in FIG. 3, and the inlet side of the pump can be connected to a separate fitting (not shown) in the hopper bottom to circulate liquid from and back to car 10. A liquid handling system which includes standpipes, such as that system disclosed in U.S. Pat. No. 3,338,635, can also be associated with the herein disclosed liquid handling system without departing from the teachings of the present disclosure. If a standpipe is used, liquid in the container can be circulated out of the container during the formation of the slurry. Thus, the liquid circulation can occur during the liquefying step, or the agitating or mixing step, or at any other suitable time. A liquid withdrawn from the container via the standpipe can be used, stored, or circulated back into the container, as desired.

The aeration provided via the aeration devices keeps the product thoroughly mixed and agitated to insure smooth flow of product into the discharge system via conduits 150. Absent such aeration, product may become clogged in the discharge lines due to a coagulation thereof during storage and/or transport. Such clogging may slow the discharge step, or even stop that step in extreme cases. Therefore, the aeration provided by the aeration devices during the discharge step serve to expedite that discharge step.

It is thus evident that in each step requiring the use thereof, the aeration devices promote the efficiency and thoroughness of such step to a level beyond those levels attainable using those methods known prior to the present disclosure. Thus, the process comprising the above-described steps loads, mixes, stores and discharges product in a manner which is much more efficient than heretofore known processes.

Figure 7:
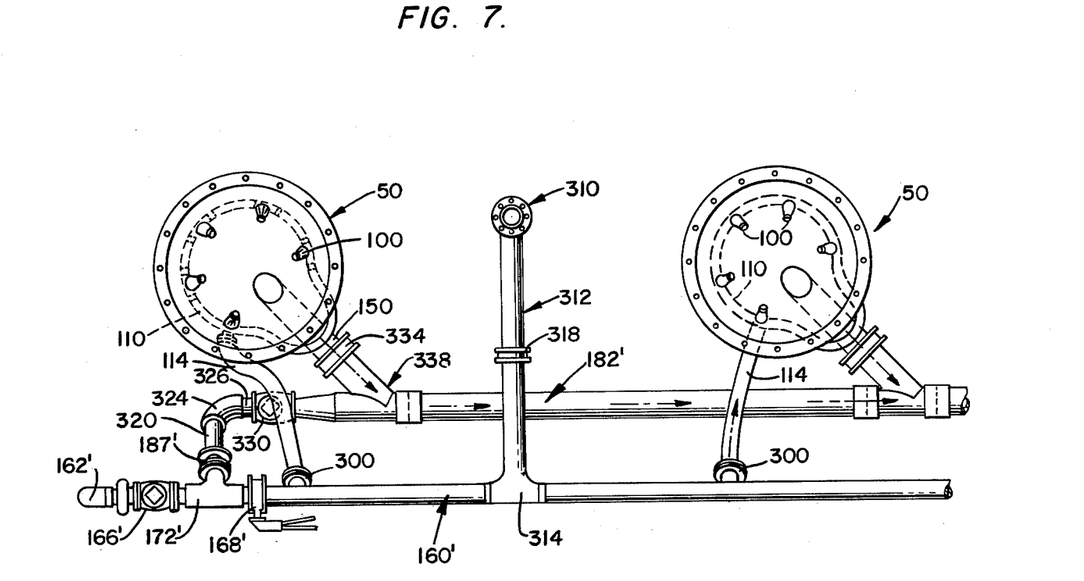
FIG. 7 shows a plan view of an embodiment of the invention used for discharging bulk material in dry form.

An arrangement for handling dry product is shown in FIGS. 7-11 inclusively. As shown in FIG. 7, the hopper bottoms 50 are arranged as disclosed above to include an air inlet hose 114 connected to an air manifold system 110 which includes a plurality of aeration devices 100. The devices 100 in the FIG. 7 embodiment are the same as in the FIG. 1 embodiment, and thus are fully disclosed in the referenced Solimar patent. The air flow from the devices 100 is indicated by the arrows 101 in FIG. 10. A conduit 150 is connected to the hopper bottom and serves as a product discharge line.

Figure 10:
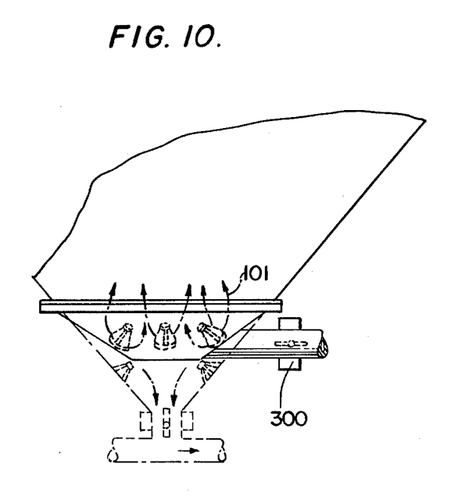
FIG. 10 is a partial elevation of the FIG. 7 embodiment.

As shown in FIG. 7, the air inlet system includes the main air inlet hose 162' connected to the check valve 166' which controls the flow of air from an air source (not shown) to the hoppers. A tee coupling 172' connects a control valve 187' and a control valve 168' connects air supply line 160' to the tee coupling 172' and hence to the air supply. A hopper close-off valve 300 connects each hopper inlet hose 114 to the air supply line 160' and can be used to selectively connect and disconnect each hopper to the air supply line. The valves 300 are optional and enable the system to operate with limited air supplies, and/or with difficult product. The valves 300 permit operation of one hopper at a time. A close-off valve is shown in FIG. 10 in the open configuration.

A standpipe 310 is connected to the air line 160' by a feed line 312 and a tee coupling 314. A standpipe control valve 318 is located in the feed line 312 to control the flow of air from the supply line 160' to the standpipe 310.

A product discharge system includes a pipe section 320 connecting the control valve 187' to an elbow 324 which is connected to a second pipe section 326. As in the above-disclosed embodiment, the valve 187' is a balancing valve and balances the air flowing into each of the pipes 160' and 182' to proper and desired levels. A control valve 330 controls the flow of air from the supply into product discharge line 182'. Each hopper conduit 150 is connected to a product discharge valve 334 which is connected by a Y-coupling 338 to the product discharge line 182'.

The product discharge valves 334 control the flow of dry product out of each hopper and can be used to shut off each hopper either temporarily (to, for example, loosen a plug of product lodged in the hopper discharge line 150, or the like, or permanently (e.g., after the hopper is completely empty).

Figure 8:
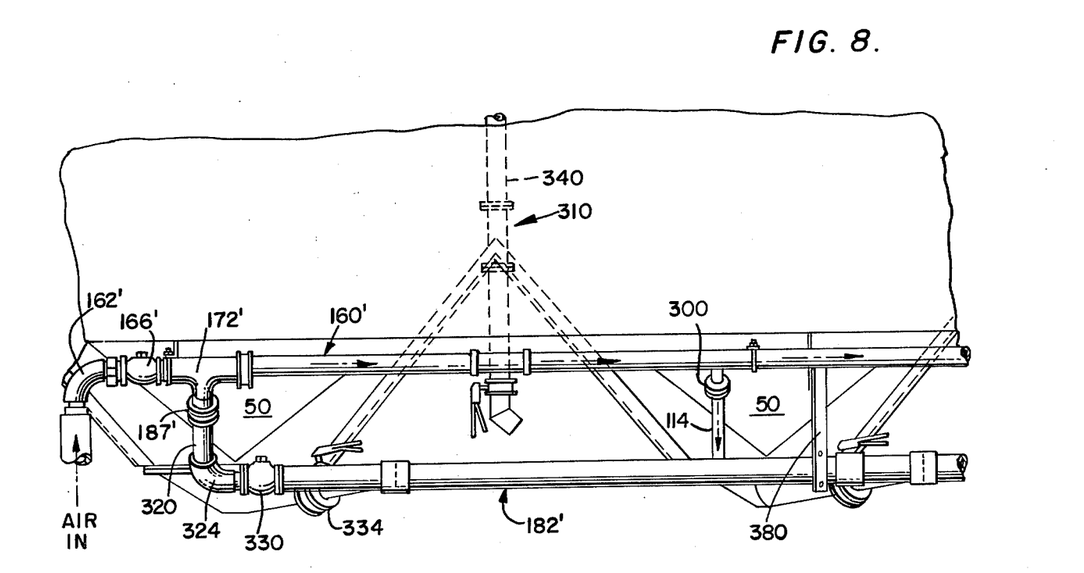
FIG. 8 is an elevation view of the FIG. 7 embodiment.
Figure 9:
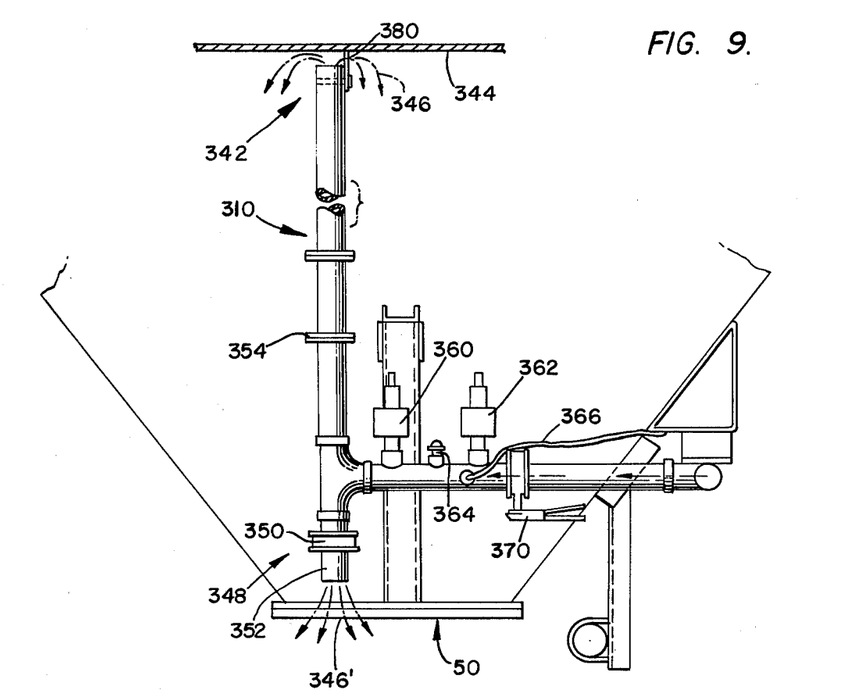
FIG. 9 is an elevation view showing a portion of the FIG. 7 embodiment.

As shown in FIGS. 8 and 9, the standpipe 310 includes a vertical section 340 having an exit section 342 located near the top of the container 344 to discharge pressurizing air 346 into that container, and a blow-down section 348 located near the hopper bottom 50. The section 348 includes a blow-down valve 350 and a vent pipe 352 which is open to the atmosphere to discharge pressurizing air 346' thereinto. Various flanges, such as flange 354, connect pipe sections together to form a standpipe having a proper length. The blow-down section 348 is used to relieve air pressure within the container.

A pair of pressure relief valves 360 and 362 are positioned in the standpipe feed line, as is a vacuum relief valve 364. A remote control system (not shown) can be used to operate these valves, and a lead wire 366 is shown in FIG. 9 to indicate connection to such control system. A standpipe control valve 370 is connected to the feed line 312 to further control the amount of air flowing into the standpipe.

Figure 11:
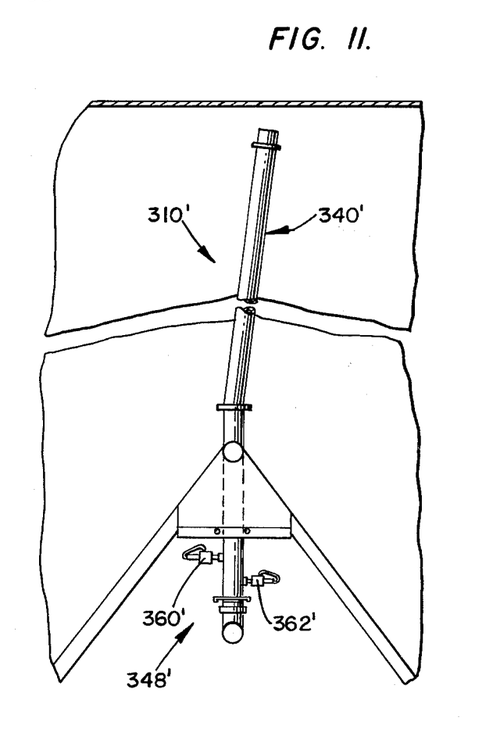
FIG. 11 is an elevation view of an alternative form of a standpipe.

An alternative embodiment of the standpipe is shown in FIG. 11 and is indicated by the numeral 310'. The standpipe 310' includes a tilted section 340' and pressure relief valves 360' and 362' located in the blow-down section 348'. The blow-down section 348' is open to atmosphere, as is blow-down section 348 to vent air thereto. Otherwise, the standpipe 310' is similar to the standpipe 310.

Suitable pipe hangers 380, and other such elements are also included to properly mount the pipes on the container. Suitable baffles can also be included to isolate each hopper from the others, if so desired.

The operation of the system shown in FIGS. 7-11 will now be discussed. Normally, only one hopper is unloaded at a time, and the hoppers are unloaded sequentially. To initiate unloading, valves 166', 187' and 330 are opened with control valve 168' closed to force air through the discharge line 182'. The air is initially forced through the product discharge line into the product collection means, such as a silo, or the like, to permit the air moving devices, such as blowers or the like, to come up to working levels. Once these working levels are attained, control valve 187' is closed and valve 168' is positioned to flow air through the air supply line 160' and into the hopper air systems as previously described. Air also flows through the standpipe into the container.

All of the air is forced through the aeration devices 100 to fluidize the product. Once the product is sufficiently fluidized, control valve 187' is opened slightly to permit air to flow into the product discharge line. It is noted that container pressure is generally maintained in the range of 10 to 12 psig, and can be controlled via the standpipe system.

Once the proper air flow is established through both the aeration systems and the product discharge line, the hopper product discharge valve 334 on the first hopper is opened. Product from that first hopper then flows into the product discharge line and then to the product collection means.

Product is discharged until line pressure and container pressure both drop thereby signifying an empty tank, or in the case of a hopper-type railcar, an empty hopper. At this time, the valve 334 of the first hopper is closed, and the valve 334 of the next hopper is opened, that hopper pressurized and emptied in the manner just described. The process is continued until all of the hoppers are emptied.

There may be some residual product remaining in each of the hoppers after the completion of the just-described process. Each hopper is individually opened to the product line via valves 334 and each hopper is pressurized to a fairly high value. Such procedure discharges the residual product from each hopper into the discharge line.

It is noted that on a three hopper car, it is preferable to empty the center hopper first, then emptying the end hoppers. In a four hopper car, baffles may be present to limit product shift, and thus it is preferable to empty an endmost hopper first, then proceed to the next adjacent hopper, and so on.

It is noted that air is forced into the product through the aeration devices at all times during the discharge process. In this manner, the product is thoroughly fluidized and is therefore efficiently unloaded. The blow-down sections of the standpipes can be used to further control the pressure inside the container. The pressure relief valves and the vacuum relief valves in the standpipe feed line are optional and can be used to direct some, or all, of the air supply into the container. An operator thus has extra control valves which can be adjusted to optimize settings for a particular combination of product and air supply. The air flow established in the product line keeps the product therein fluidized and moving efficiently therethrough.

The product discharge valves 334 can also be used to discharge any product clogged in the hopper discharge lines 150. Closing the valve 334 and pressurizing a hopper, then popping the valve 334 open will unplug the discharge line.

The system shown in FIGS. 7-11 can be used in conjunction with either a railroad car or a road vehicle. As shown in FIG. 10, a railroad car will have a hopper wall inclination angle of about 30° whereas a hopper-type trailer will have hopper walls inclined at about 45° with respect to the vertical. The difference in wall angle results from clearance differences between rail cars and trailers as well as considerations of container center of gravity.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:
1. A hopper-type container comprising:
   a container body having a hopper for containing a product to be formed into and handled as a slurry or solution;
   a gas induction system for inducting gas into said container body, said gas system including an inlet conduit for connecting a source of gas to said container body, an aeration device mounted on the bottom of said container body hopper, said aeration device having gas discharge means located closely adjacent the hopper bottom for discharging air into said container body adjacent the hopper bottom, and a conduit connecting said aeration device to said inlet conduit;

a liquid handling system connected to the bottom of said hopper for conducting liquid to and from said container body hopper from a liquid source and conducting a slurry or a solution from said container to a slurry or solution handling system; and cross-over valves connecting said gas induction system to said liquid handling system for introducing gas into said container body through said liquid handling system.

2. The container defined in claim 1 wherein said container is a railroad car.

3. The container defined in claim 1 further including control valves in said gas induction and liquid handling systems for controlling the flow of fluid through said systems.

4. The container defined in claim 1 further including a plurality of aeration devices and conduits interconnecting said aeration devices.

5. The container defined in claim 1 wherein said container body includes a plurality of hoppers.

6. A method of forming and handling a slurry or solution in a hopper-type container including the steps of:

placing a quantity of dry material into a container;

forcing gas through said dry material to agitate said dry material;

continuing to agitate said dry material by forcing gas thereinto while simultaneously liquefying said dry material by forcing liquid through said material; and agitating and mixing said liquefied material to produce a liquefied mass having a consistent composition.

7. A method of forming and handling a slurry or solution as defined in claim 6 wherein said container is a railroad car.

8. A method of forming and handling a slurry or solution as defined in claim 6 wherein said container includes a plurality of hoppers.

9. A method of forming and handling a slurry or solution as defined in claim 6 further including a step of discharging said slurry from said container.

10. A method of forming and handling a slurry or solution as defined in claim 9 wherein said agitating and mixing step includes forcing gas into said material through the system used to force liquid into said material.

11. A method of forming and handling a slurry or solution as defined in claim 9 further including a step of forcing gas into said material during said discharge step.

12. A method of forming and handling a slurry or solution as defined in claim 11 further including a step of using said gas to pressurize said container during said discharge step to assist in said discharge of said slurry from said container.

13. A method of forming and handling a slurry or solution as defined in claim 11 wherein said gas is air.

14. A method of forming and handling a slurry or solution as defined in claim 6 wherein said gas is air.

15. A method of forming and handling a slurry or solution as defined in claim 6 wherein an external pump is used to circulate liquid into said container.

* * * * *